United States Patent [19]
Yun

[11] Patent Number: 6,097,686
[45] Date of Patent: Aug. 1, 2000

[54] DISK PLAYER HAVING A DISK LOADING APPARATUS FOR LOADING A DISK WITHOUT USING A TRAY

[75] Inventor: Sung-hwa Yun, Suwon, Rep. of Korea

[73] Assignee: Samsung Electronics Co., Ltd., Kyungki-do, Rep. of Korea

[21] Appl. No.: 08/820,083

[22] Filed: Mar. 19, 1997

[30] Foreign Application Priority Data

May 17, 1996 [KR] Rep. of Korea ...................... 96-16733

[51] Int. Cl.[7] ............................ G11B 33/02; G11B 17/04
[52] U.S. Cl. ......................... 369/75.2; 369/77.1; 369/191
[58] Field of Search ................................. 369/75.1, 77.1, 369/77.2, 191, 261, 262, 264; 312/9.18, 9.26

[56] References Cited

U.S. PATENT DOCUMENTS

| | | | |
|---|---|---|---|
| 4,498,162 | 2/1985 | Schatteman | 369/77.1 |
| 4,577,307 | 3/1986 | Woods et al. | 369/270 |
| 4,627,042 | 12/1986 | Hara | 369/77.1 |
| 4,979,160 | 12/1990 | Araki | 369/75.2 |
| 5,022,023 | 6/1991 | Toyoguchi | 369/77.1 |
| 5,031,171 | 7/1991 | Kurumada et al. | 369/270 |
| 5,038,337 | 8/1991 | Muramatsu et al. | 369/77.1 |
| 5,119,354 | 6/1992 | Umesaki | 369/36 |
| 5,260,925 | 11/1993 | Camps et al. | 369/77.1 |

FOREIGN PATENT DOCUMENTS

| | | | |
|---|---|---|---|
| 61-98259 | 6/1986 | Japan | 369/77.1 |
| 4-195854 | 7/1992 | Japan | 369/77.1 |

*Primary Examiner*—Stuart S. Levy
*Assistant Examiner*—Tod Kupstas
*Attorney, Agent, or Firm*—Sughrue, Mion, Zinn, Macpeak & Seas, PLLC

[57] ABSTRACT

A disk player including a baseframe having an opening into which a disk is inserted, a deck fixed to the baseframe, a spindle motor fixed to the deck and having a shaft, a turntable fixed to the shaft of the spindle motor, rollers installed in upper and lower portions of the opening or on left and right sides of the opening, for clamping the disk inserted through the opening and moving the disk toward an upper portion of the turntable, and a disk setting portion for setting the disk onto the turntable.

10 Claims, 9 Drawing Sheets

DISK PLAYER HAVING A DISK LOADING APPARATUS FOR LOADING A DISK WITHOUT USING A TRAY

BACKGROUND OF THE INVENTION

1. Field of the Invention

The present invention relates to a disk player, and more particularly, to a disk player having an apparatus for loading a disk on a turntable without using a tray.

2. Background Art

Referring to FIGS. 1 and 2, a conventional loading apparatus for loading a disk 1 on a turntable 2 includes a tray 3 and a deck lifting means in a disk player 10.

The deck lifting means includes a deck 4 having one end that is pivotally connected to a baseframe 5, and a cam 6 and a motor 7, installed in the baseframe 5, for lifting and lowering the deck 4.

When a user pushes a button 8 (FIG. 1), the tray 3 is ejected from the disk player 10. When a user puts the disk 1 on the tray 3 ejected from the disk player 10 and pushes the button 8 again, the tray 3 retreats to the inside of the disk player 10. The deck 4 is tiltingly lifted by the rotation of the cam 6 and motor 7. As the deck 4 ascends, the disk 1 is seated and rotates on the turntable 2 fixed to a shaft of a spindle motor 9. Then, a pickup assembly 11 records or reads the information cn/from the disk 1, while moving radially relative to the disk 1 by a rack 12 and pinion 13 along a pair of guide rails 14 and 15 fixed to the deck 4.

However, in the conventional disk player having the above described disk loading mechanism, the tray 3 must be ejected from the disk player 10 to load the disk 1 on the turntable 2. In so doing, the tray 3 may be damaged or broken by colliding with other objects. Also, since an additional means for lifting and lowering the deck 4 is required, the number of parts and the manufacturing costs are increased.

SUMMARY OF THE INVENTION

It is an object of the present invention to provide a disk player having a disk loading apparatus in which a disk is directly inserted into a disk player without using a tray, and without lifting a deck.

To achieve the above object, there is provided a disk player according to the present invention, comprising a baseframe having an opening into which a disk is inserted, a deck fixed to the baseframe, a spindle motor fixed to the deck, a turntable fixed to a shaft of the spindle motor, rollers installed in the upper and lower portions of the opening or on the left and right sides of the opening, for clamping the disk inserted through the opening and moving the disk toward the upper portion of the turntable, and a means for setting the disk onto the turntable.

The means for setting the disk comprises a pair of supporting stands each having a tilted or inclined slot and being fixed to the deck, a mobile frame installed between the supporting stands and having a pin fixed thereto and coupled with the slot, a guiding piece, attached to the lower portion of the mobile frame, for supporting the disk inserted toward the upper portion of the turntable, means for raising and lowering the mobile frame, and a semicircular push portion for pushing the disk toward the rollers when the mobile frame is raised by the means for raising and lowering.

BRIEF DESCRIPTION OF THE DRAWINGS

The above objects and advantages of the present invention will become more apparent by describing in detail a preferred embodiment thereof with reference to the attached drawings, in which.

DETAILED DESCRIPTION OF THE INVENTION

A first preferred embodiment of a disk player according to the present invention will be described in detail with reference to FIGS. 3 to 6.

Figure 1:
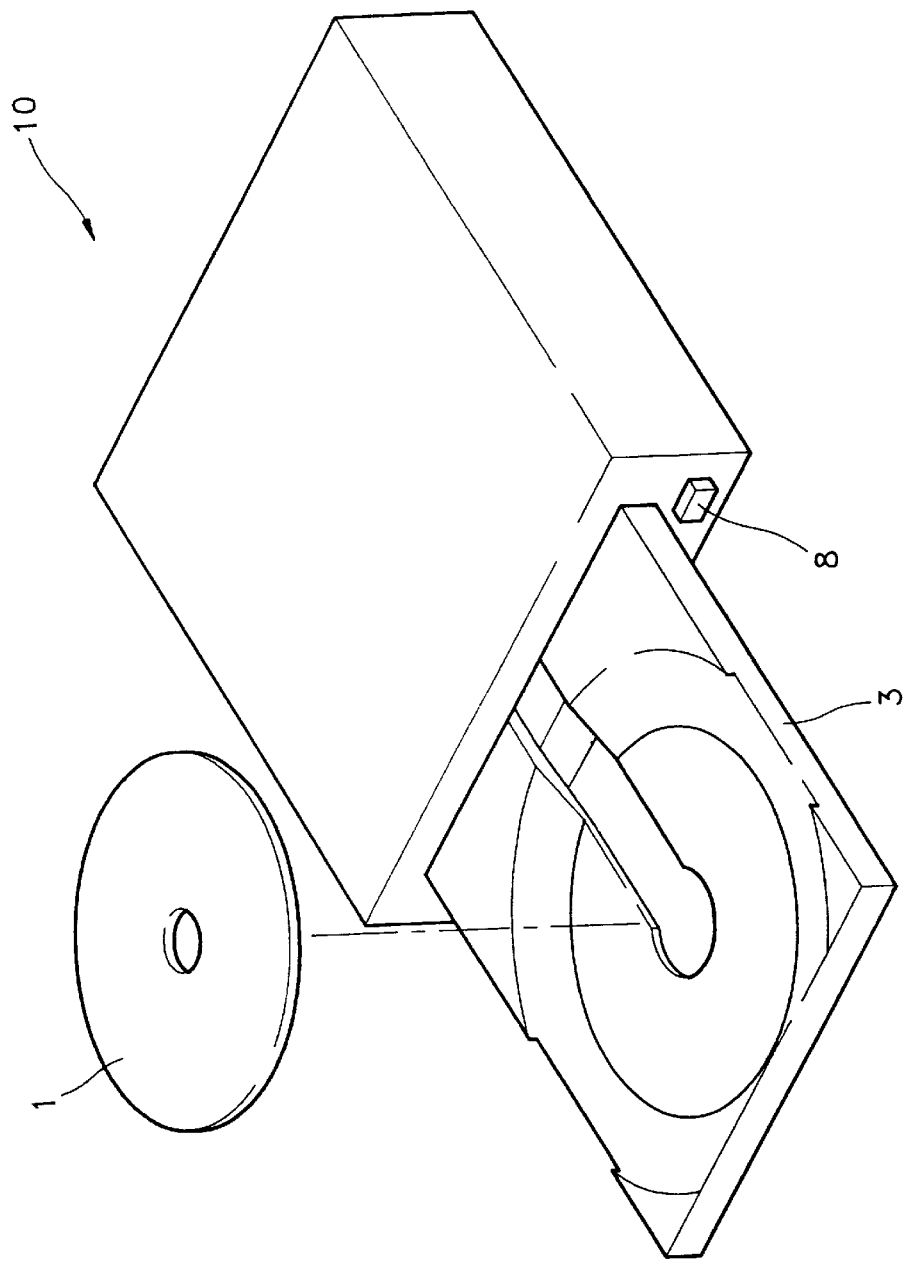
FIG. 1 is a perspective view showing a conventional disk player having a loading apparatus using a tray.
Figure 2:
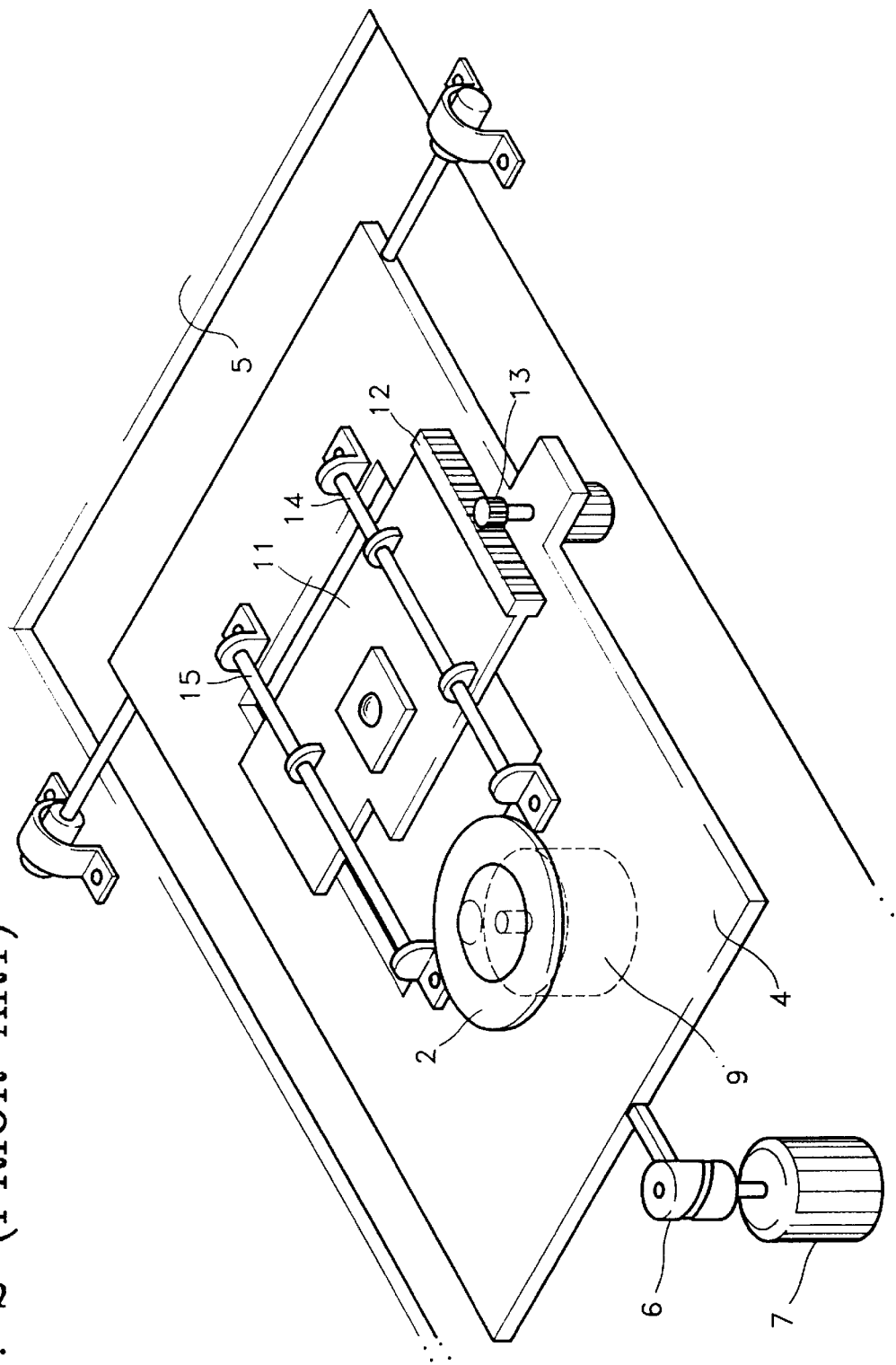
FIG. 2 is a perspective view schematically showing the inside of the conventional disk player shown in FIG. 1.
Figure 3:
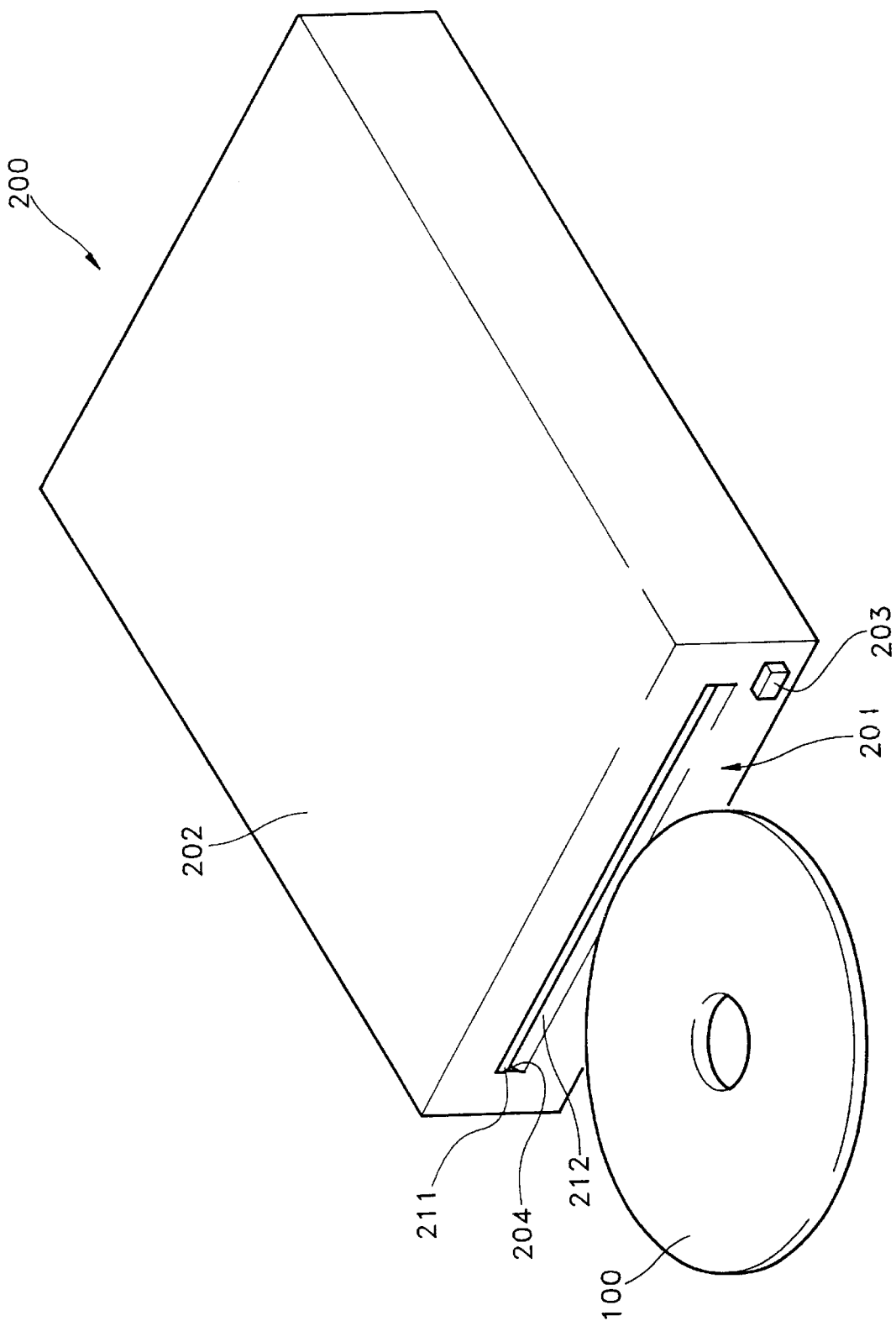
FIG. 3 is a perspective view showing a disk player having a disk loading apparatus according to a first embodiment of the present invention.
Figure 4:
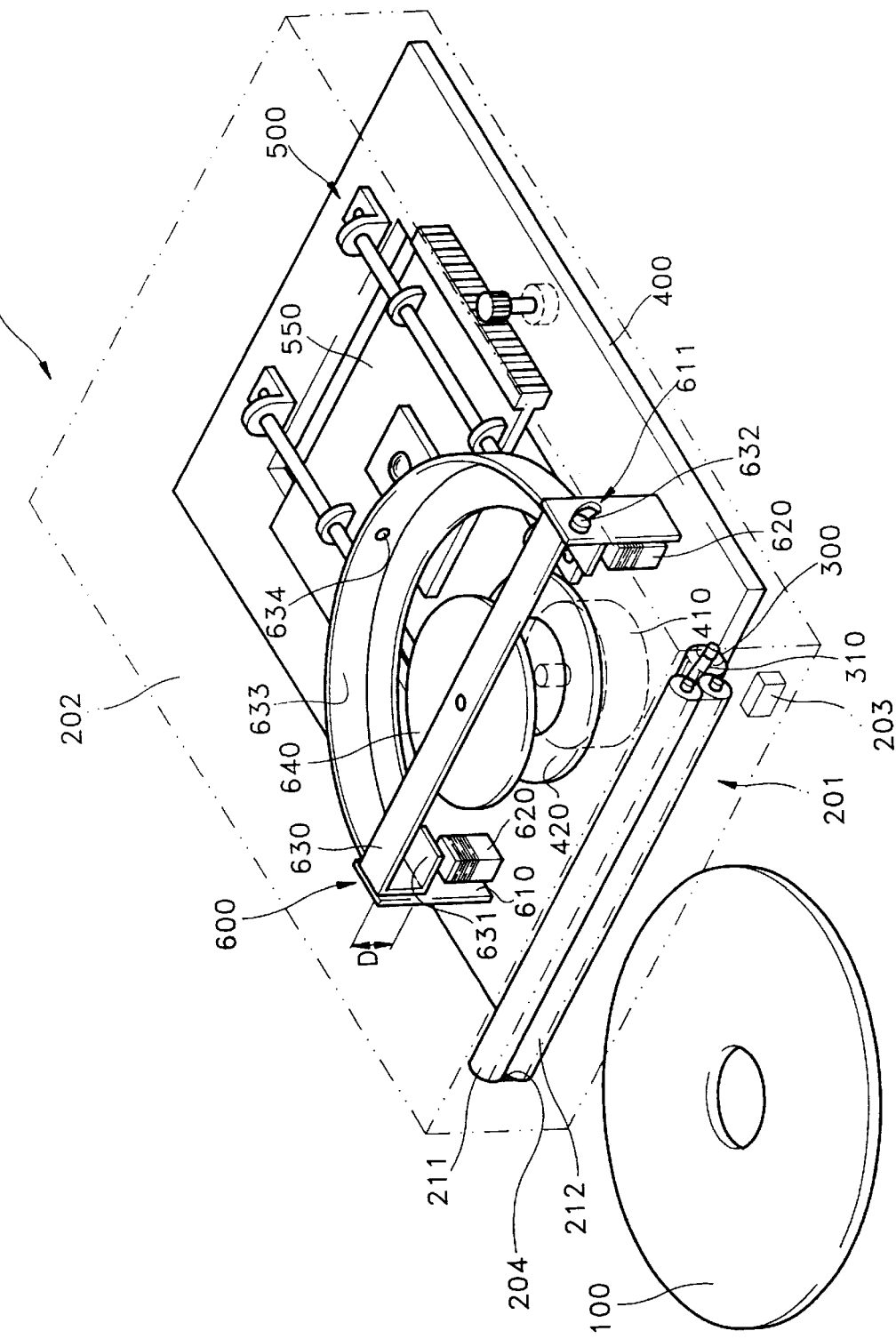
FIG. 4 is a perspective view showing the inside of a disk player according to the first embodiment of the present invention shown in FIG. 3.

Referring to FIGS. 3 and 4, a disk player 200 according to the present embodiment includes a baseframe 202 having an opening 201 into which a disk 100 is inserted, a deck 400 fixed to the lower surface of the baseframe 202, a spindle motor 410 installed in the deck 400, a turntable 420 fixed to the shaft of the spindle motor 410, a pair of rollers 211 and 212, installed in the upper and lower portions of the opening 201 respectively, for transmitting the inserted disk 100 toward the upper portion of the turntable 420, and a disk setting means 600 for setting the transmitted disk on the turntable 420.

The disk 100 is inserted or ejected through the opening 201 by the rollers 211 and 212. The rollers 211 and 212 are covered by a soft material such as sponge, so that the disk 100 can be inserted and ejected without being damaged.

A first sensor 204 is installed on the baseframe 202 at one side of the opening 201 between the rollers 211 and 212, thereby sensing the disk inserted through the opening 201.

The upper roller 211 is connected by a belt 310 to a motor 300 fixed to the baseframe 202. Since the rollers 211 and 212 rotate as the motor 300 rotates, the disk 100 is inserted into the disk player 200.

The disk setting means 600 for setting the inserted disk 100 on the turntable 420 and for guiding the disk 100 set on the turntable 420 toward the rollers 211 and 212 is installed in the deck 400. A pickup 550 and a pickup transmitting means 500 are also installed in the deck 400.

The disk setting means 600 includes a pair of supporting stands 610 fixed to the deck 400, a mobile frame 630 installed between the supporting stands 610, and an electromagnet 620 for lifting and lowering the mobile frame 630.

An inclined slot 611 is formed in the supporting stands 610, and a pin 632 fixed to the mobile frame 630 is inserted into the slot 611 and slides along its length.

A magnetized guiding piece 631 for supporting and guiding the inserted disk 100 is formed in the mobile frame 630. A semicircular push portion 633 for pushing the disk 100 toward the rollers 211 and 212 when the mobile frame 630 ascends is formed in the guiding piece 631. A second sensor 634 is provided for sensing when the inserted disk 100 is installed in the semicircular push portion 633. A clamp 640 for pressing the disk 100 onto the turntable 420 is installed at the center of the mobile frame 630.

The distance D between the mobile frame 630 and the guiding piece 631 is set such that the disk 100 can be smoothly inserted and ejected and the clamp 640 can press the disk 100 to the turntable 420 as the mobile frame 630 descends.

The operation of the disk player according to a first embodiment of the present invention will be described with reference to FIGS. 4 to 6.

When the disk 100 is inserted through the opening 201, the first sensor 204 installed at the side of the opening 201 senses the inserted disk 100 and the motor 300 is driven by a controller (not shown). Since the rotation of the motor 300 is transmitted to rotate the rollers 211 and 212 by the belt 310, the disk 100 caught between the rollers is then inserted toward the inside of the disk player 200. Then, the inserted disk 100 is supported by the guiding piece 631 of the disk setting means 600 as shown in FIG. 5. When the second sensor 634 installed in the semicircular push portion 633 senses the disk 100, the motor 300 is stopped by the controller and then the electromagnet 620 is driven.

At this time, the motor 300 stops before the disk 100 touches the semicircular push portion 633 while one end of the disk 100 is still caught between the rollers 211 and 212.

Figure 5:
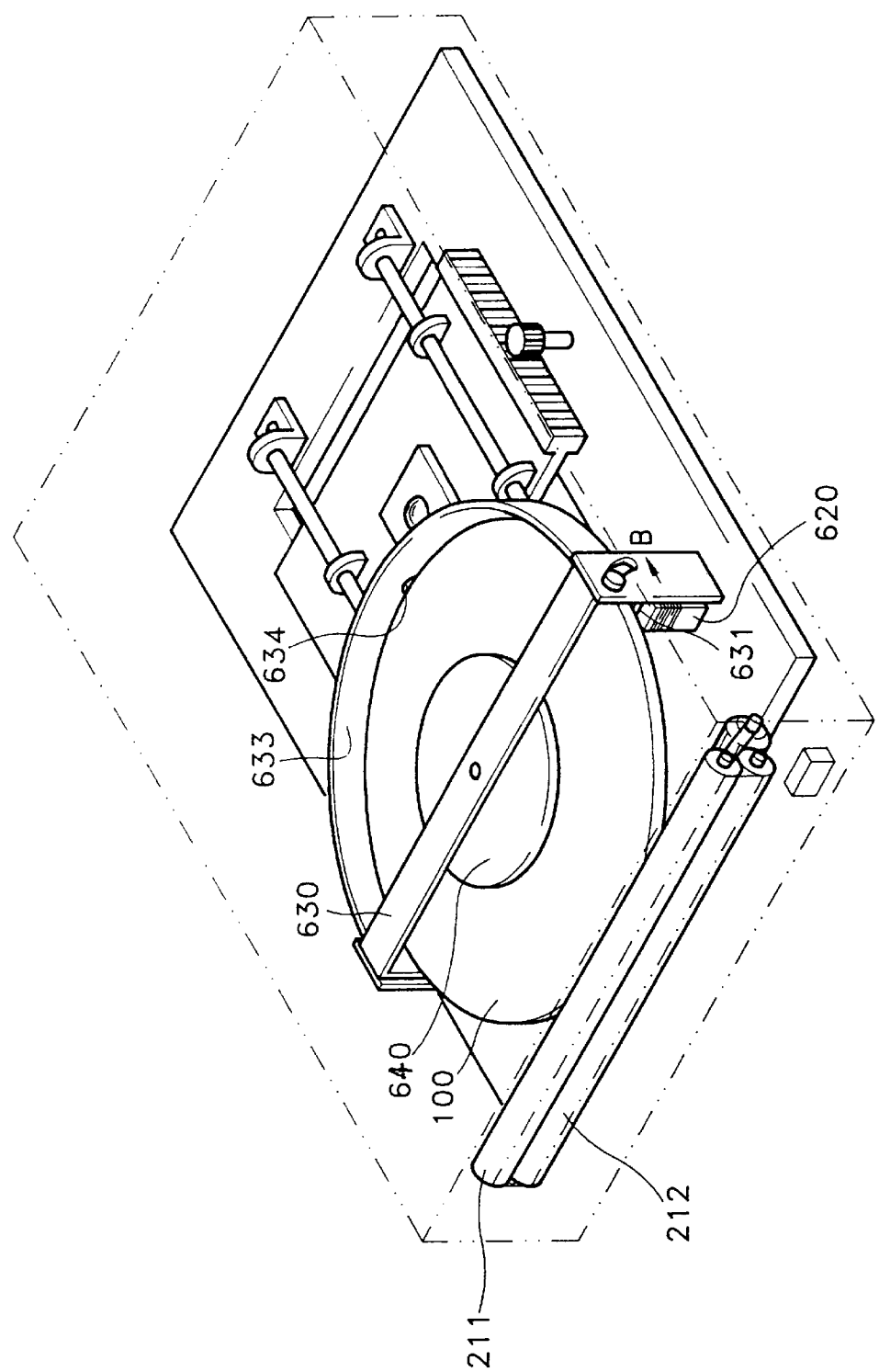
FIG. 5 is a perspective view showing a state in which a disk is inserted into the disk player according to the first embodiment of the present invention shown in FIG. 3.

As the electromagnet 620 is driven to attract the magnetized guiding piece 631, the mobile frame 630 descends along the slot 611 moving in a direction B (FIG. 5).

Figure 6:
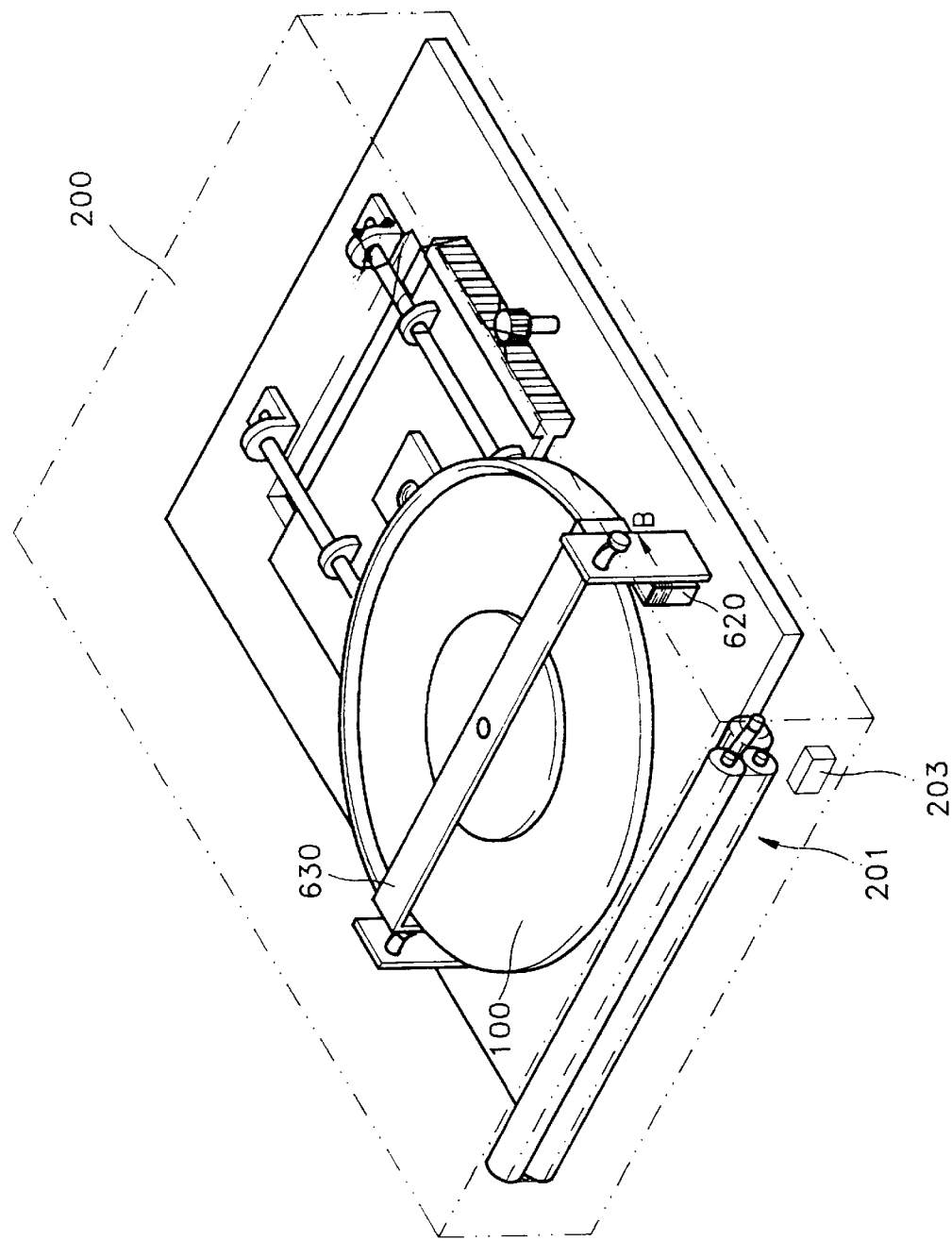
FIG. 6 is a perspective view showing a state in which a disk is loaded in the disk player according to the first embodiment of the present invention shown in FIG. 3.

Therefore, the disk 100 completely comes out of the rollers 211 and 212 and is set on the turntable 420 (FIG. 4) as shown in FIG. 6, and the clamp 640 presses the disk 100 to the turntable 420. At this time, the disk 100 is separated from the guiding piece 631. In the state in which the disk 100 is completely loaded, predetermined information is recorded on the disk 100 or read therefrom when the spindle motor 410 (FIG. 4) rotates as the pickup 550 moves radially relative to the disk 100.

When an ejecting button 203 is pushed, the mobile frame 630 ascends due to the change of the polarity of the electromagnet 620 and the disk 100 is ejected through the opening 201 in the reverse order of the above mentioned loading order. At this time, the semicircular push portion 633 pushes the disk 100 toward the rollers 211 and 212.

In the embodiment described above, the guiding piece 631 is magnetized so that when the polarity of the electromagnet 620 is changed, the guiding piece 631 is attracted/repelled. Alternatively, or in addition thereto, another biasing member (such as a spring—not shown) could be used to raise and lower the mobile frame 630.

Figure 7:
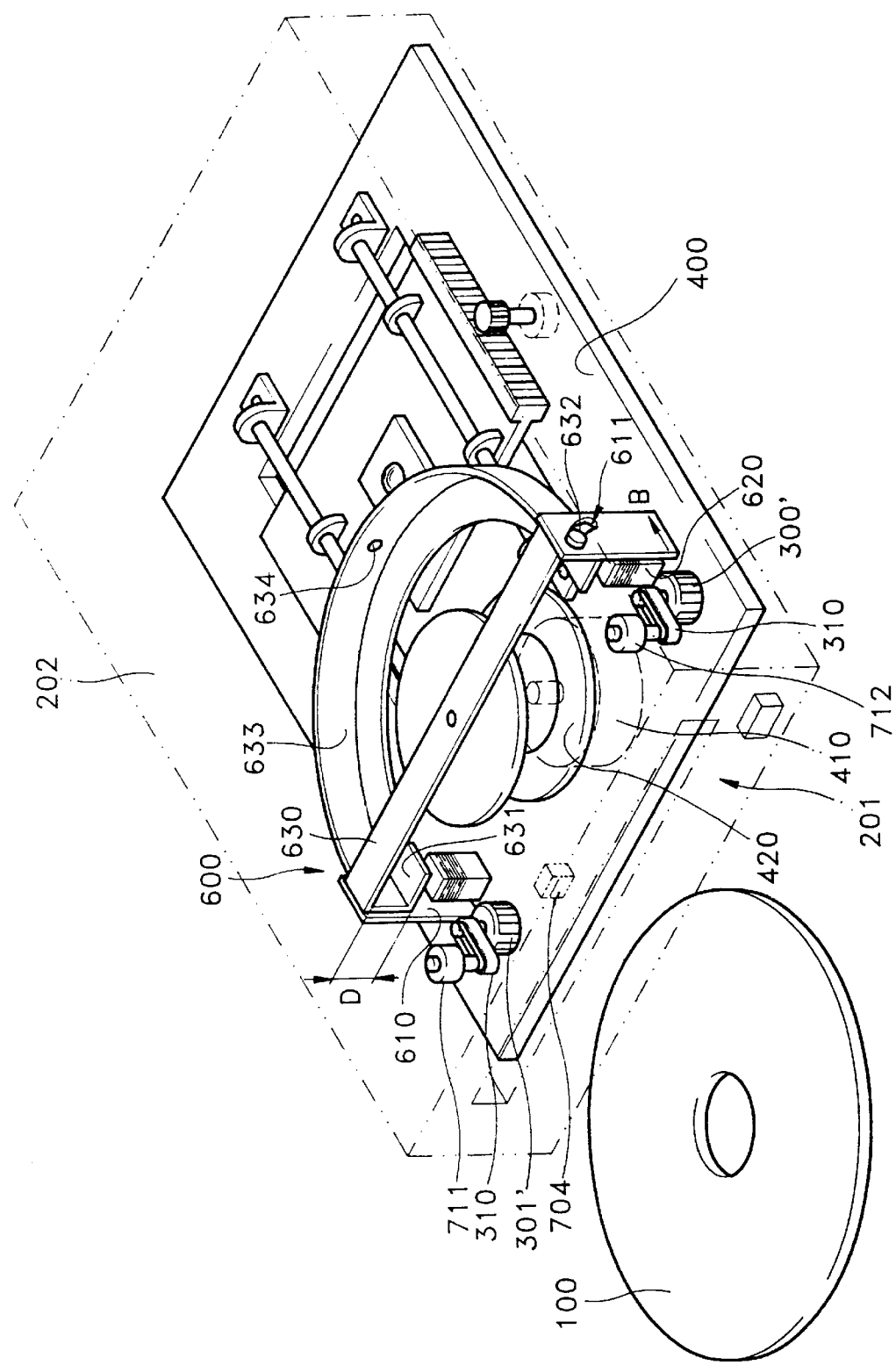
FIG. 7 is a perspective view showing a disk player having a disk loading apparatus according to a second embodiment of the present invention.
Figure 8:
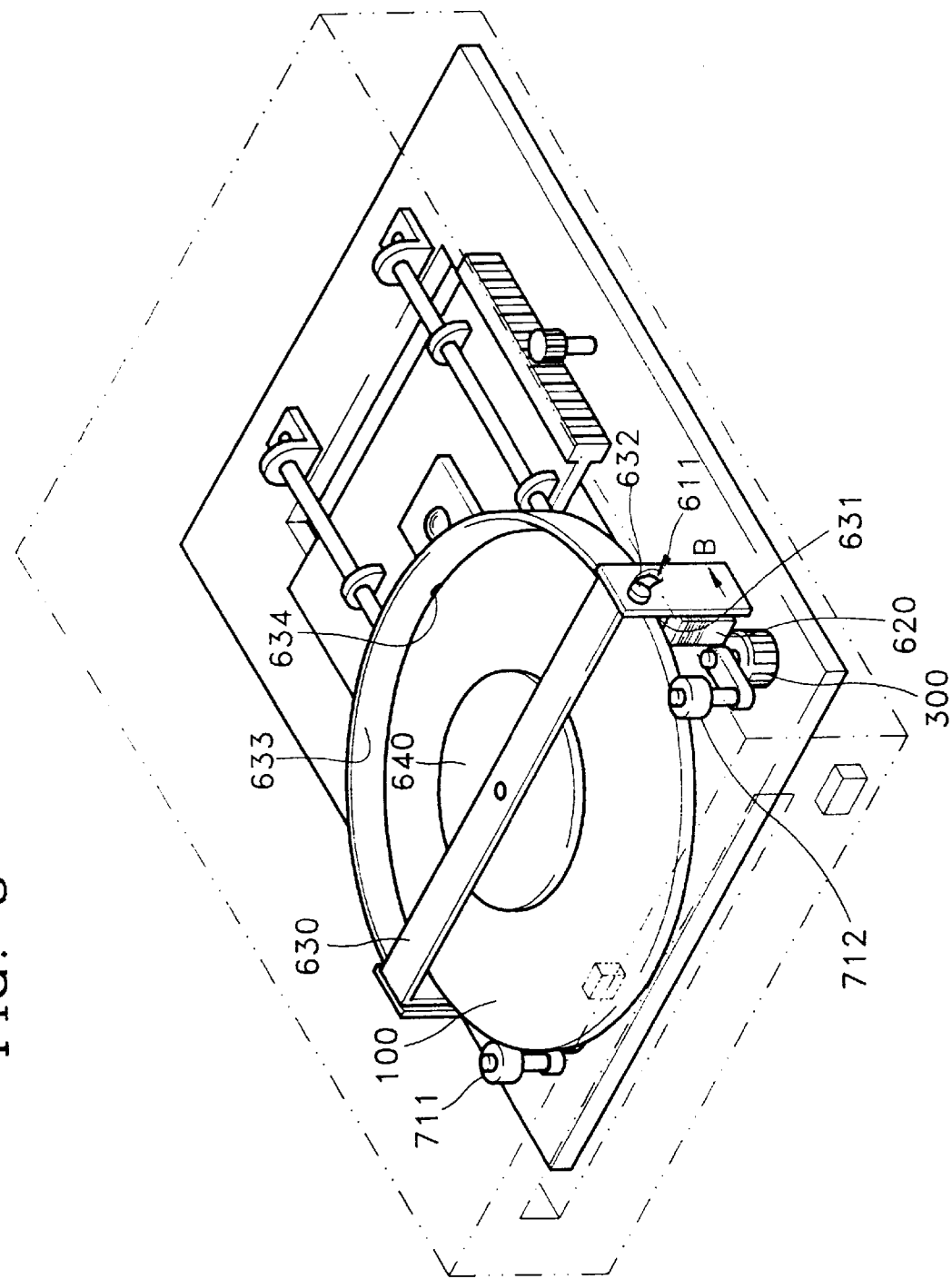
FIG. 8 is a perspective view showing a state in which a disk is inserted into the disk player according to the second embodiment of the present invention shown in FIG. 7.
Figure 9:
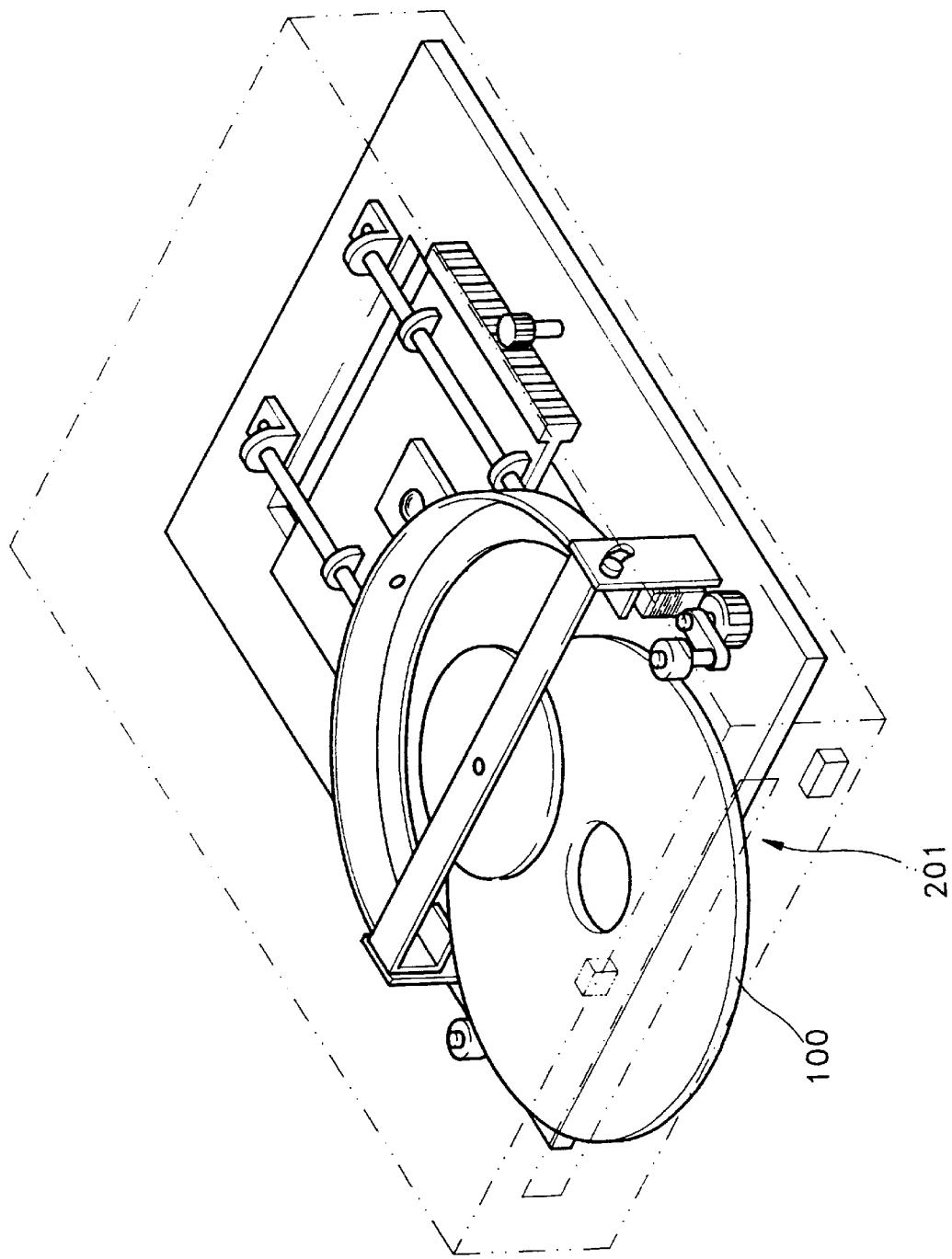
FIG. 9 is a perspective view showing a state in which a disk is ejected from the disk player according to the second embodiment of the present invention shown in FIG. 7.

FIGS. 7 to 9 show a preferred second embodiment of the disk player having the disk loading apparatus according to the present invention. Here, the same reference numerals indicate the same members having the same function throughout the attached drawings.

According to the second embodiment, rollers 711 and 712 are installed inside the baseframe 202 at the left and right sides of the opening 201. The rollers 711 and 712 are for inserting/ejecting the disk 100 into/from the disk player, and they are connected to motors 300' and 301' fixed to the baseframe 202 by the belt 310.

Also, a first sensor 704 for sensing the insertion of the disk 100 is installed on the inner surface of the baseframe 202 at the upper portion of the opening 201.

In the operation of the disk player according to the present embodiment, when the disk 100 is inserted through the opening 201, the first sensor 704 senses the inserted disk 100 and the motors 300' and 301' are driven by the controller (not shown). As the rollers 711 and 712 rotate by the rotation of the motor 300' and 301', the disk 100 is inserted toward the inside of the disk player as shown in FIG. 8. The inserted disk 100 is supported by the guiding piece 631 of the disk setting means 600 and is set on the turntable 420 in the same manner as described in the first embodiment.

When the disk 100 is ejected by the rollers 711 and 712, approximately ⅓ of the disk protrudes outside the opening 201, as shown in FIG. 9. Therefore, a user can easily remove the disk 100 by grasping its edge.

Since the disk player according to the present invention has a disk loading apparatus that does not require a tray, the loading apparatus is not damaged or broken when the tray is moved to insert or eject a disk. Also, the disk insertion and ejecting operation is smooth and stable since the disk setting means fixed to the deck is used to clamp the inserted disk, instead of lifting the deck.

The present invention is not restricted to the above preferred embodiments, and it should be clearly understood that many variations are possible within the scope and spirit of the present invention by anyone skilled in the art.

What is claimed is:

1. A disk player, comprising:

a baseframe having an opening into which a disk is inserted;

a deck fixed to said baseframe;

a spindle motor fixed to said deck, said spindle motor having a shaft;

a turntable fixed to said shaft of said spindle motor;

rollers, disposed at upper and lower portions of said opening, for clamping the disk inserted through said opening and moving the disk toward an upper portion of said turntable; and means for setting the disk onto said turntable, wherein said means for setting comprises:

a magnetic guiding piece that contacts the disk to support and guide the disk;

an electromagnet adjacent said guiding piece; and means for energizing said electromagnet to attract or repel said guiding piece, wherein said electromagnet is energized by said energizing means to move said magnetic guiding piece to a position at which the disk, which is supported by said magnetic guiding piece, solely rests on said turntable.

2. A disk player as claimed in claim 1, wherein said means for setting further comprises:

supporting stands each having an inclined slot and being fixed to said deck;

a mobile frame disposed between said supporting stands and having pins fixed thereto, each pin being coupled with said slot in a respective one of said supporting stands, wherein said guiding piece is attached to said mobile frame; and a push portion for pushing the disk toward said rollers.

3. A disk player as claimed in claim 2, further comprising a sensor, disposed at a side of said opening, for sensing when a disk is inserted into said opening.

4. A disk player as claimed in claim 2, wherein outer circumferences of said rollers are wrapped with a soft material.

5. A disk player as claimed in claim 2, further comprising a sensor, disposed in said push portion, for sensing when the disk is supported by said guiding piece.

6. A disk player, comprising:
   - a baseframe having an opening into which a disk is inserted;
   - a deck fixed to said baseframe;
   - a spindle motor fixed to said deck, said spindle motor having a shaft;
   - a turntable fixed to said shaft of said spindle motor;
   - rollers, disposed at left and right sides of said opening, for clamping the disk inserted through said opening and moving the disk toward an upper portion of said turntable; and
   - means for setting the disk onto said turntable, wherein said means for setting comprises:
     - a magnetic guiding piece that contacts the disk to support and guide the disk;
     - an electromagnet adjacent said guiding piece; and
     - means for energizing said electromagnet to attract or repel said guiding piece, wherein said electromagnet is energized by said energizing means to move said magnetic guiding piece to a position at which the disk, which is supported by said magnetic guiding piece separates from said magnetic guiding piece and, rests solely on said turntable.

7. A disk player as claimed in claim 6, wherein said means for setting further comprises:
   - supporting stands each having an inclined slot and being fixed to said deck;
   - a mobile frame disposed between said supporting stands and having pins fixed thereto, each pin being coupled with said slot in a respective one of said supporting stands, wherein said guiding piece is attached to said mobile frame; and
   - a push portion for pushing the disk toward said rollers.

8. A disk player as claimed in claim 7, further comprising a sensor, disposed inside said baseframe at an upper portion of said opening, for sensing when a disk is inserted into said opening.

9. A disk player as claimed in claim 7, wherein outer circumferences of said rollers are wrapped with a soft material.

10. A disk player as claimed in claim 7, further comprising a sensor, disposed in said push portion, for sensing when the disk is supported by said guiding piece.

\* \* \* \* \*